(12) United States Patent
Otaki

(10) Patent No.: US 8,234,343 B2
(45) Date of Patent: Jul. 31, 2012

(54) ELECTRONIC DEVICE, A METHOD OF DISPLAYING MAIL INFORMATION

(75) Inventor: Yoshiaki Otaki, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 253 days.

(21) Appl. No.: 12/261,276

(22) Filed: Oct. 30, 2008

(65) Prior Publication Data

US 2009/0240775 A1  Sep. 24, 2009

(30) Foreign Application Priority Data

Mar. 24, 2008  (JP) ................. P2008-76335

(51) Int. Cl.
*G06F 15/16* (2006.01)
*G06F 3/00* (2006.01)
*G06F 17/00* (2006.01)

(52) U.S. Cl. ........ 709/206; 715/273; 715/275; 715/751; 715/752

(58) Field of Classification Search .................. 709/206
See application file for complete search history.

(56) References Cited

U.S. PATENT DOCUMENTS

| | | | | |
|---|---|---|---|---|
| 6,934,738 | B1* | 8/2005 | Furusawa et al. ............ | 709/206 |
| 2002/0137551 | A1* | 9/2002 | Toba ............................ | 455/566 |
| 2007/0016647 | A1* | 1/2007 | Gupta et al. .................. | 709/206 |
| 2007/0299923 | A1* | 12/2007 | Skelly et al. .................. | 709/206 |
| 2008/0021967 | A1 | 1/2008 | Kato | |
| 2008/0102868 | A1* | 5/2008 | Nagatomo et al. ............ | 455/466 |
| 2009/0112995 | A1* | 4/2009 | Addae et al. .................. | 709/206 |

FOREIGN PATENT DOCUMENTS

| | | |
|---|---|---|
| JP | 2005-032052 A | 2/2005 |
| JP | 2007-102582 A | 4/2007 |
| JP | 2007-300655 A | 11/2007 |
| JP | 2007-328690 A | 12/2007 |

OTHER PUBLICATIONS

JP Office Action dated May 29, 2012 as received in related application No. 2008-076335.

* cited by examiner

*Primary Examiner* — Joseph Avellino
*Assistant Examiner* — Jeong S Park
(74) *Attorney, Agent, or Firm* — Maschoff Gilmore & Israelsen

(57) ABSTRACT

An electronic device includes a receiving unit configured to receive a plurality of e-mails having a message body and an attached file, a determination unit configured to judge whether or not the message body and the attached file of each e-mail thus received by the receiving unit have been checked, a mail management unit configured to manage mail information with respect to the plurality of e-mails, including at least determination results obtained by the determination unit, a display unit, and a display control unit configured to display the mail information on the display unit.

15 Claims, 10 Drawing Sheets

| RECEIVED MAILS | | | | | | |
|---|---|---|---|---|---|---|
| RECEIVED MAIL ID | RECEPTION DATE AND TIME | SENDER | MESSAGE SUBJECT | MESSAGE BODY CHECK | ATTACHED FILE CHECK | COLOR |
| 0001 | 2008/2/1 12:30 | TOSHIBA TARO | FUNCTION SCHEDULE FOR NEXT WEEK | FALSE | FALSE | RED |
| 0002 | 2008/2/1 11:50 | SUZUKI ICHIRO | RE: I AM SENDING YOU THE MEETING MINUTES | FALSE | NONE | RED |
| 0003 | 2008/1/1 23:30 | TOSHIBA TARO | RE: QUESTION ABOUT OPERATION SPECIFICATIONS FOR NEXT MODEL | TRUE | NONE | BLACK |
| 0004 | 2008/1/1 22:10 | TOSHIBA TARO | I AM SENDING YOU THE MEETING MINUTES | TRUE | TRUE | BLACK |
| 0005 | 2008/1/1 22:05 | TANAKA GORO | I AM SENDING YOU SPECIFICATIONS FOR X X X | TRUE | FALSE | GREEN |
| 0006 | 2008/1/1 20:03 | SATO SABURO | I AM SENDING YOU THE PICTURE | TRUE | TRUE | RED |
| 0007 | 2008/1/1 19:40 | ARAI KENICHI | THE FUNCTION PLAN HAS BEEN CREATED | TRUE | NONE | RED |
| 0008 | 2008/1/1 19:15 | YAMADA MASANORI | [QUESTION] ABOUT OPERATION SPECIFICATIONS FOR NEXT MODEL (PART 2) | FALSE | UN-REPRODUCIBLE | RED |
| 0009 | 2008/1/2 19:10 | YAMADA MASANORI | [QUESTION] ABOUT OPERATION SPECIFICATIONS FOR NEXT | TRUE | UN-REPRODUCIBLE | BLACK |
| ... | ... | ... | ... | ... | ... | ... |
| ... | ... | ... | ... | ... | ... | ... |

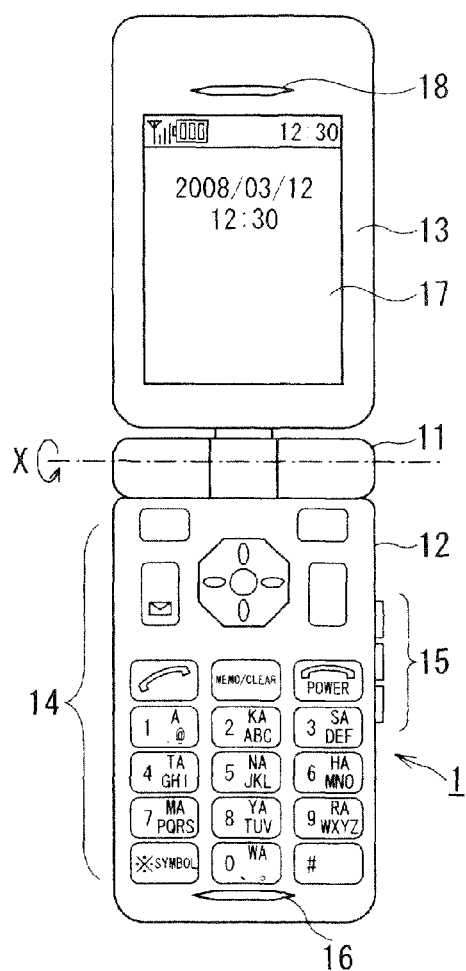
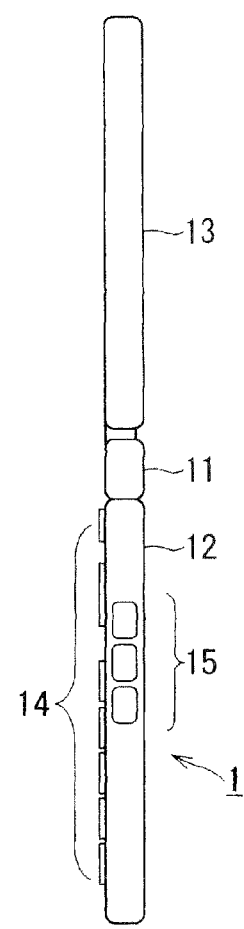
FIG. 1A          FIG. 1B
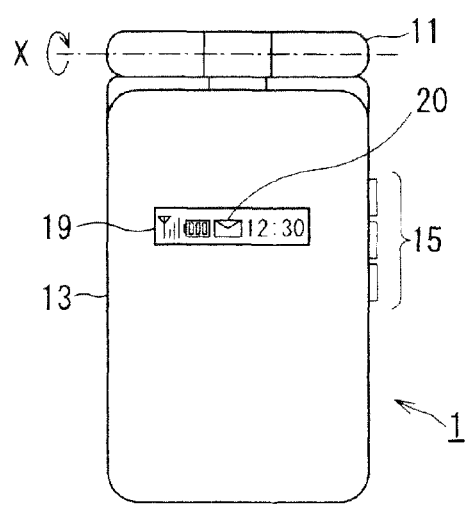
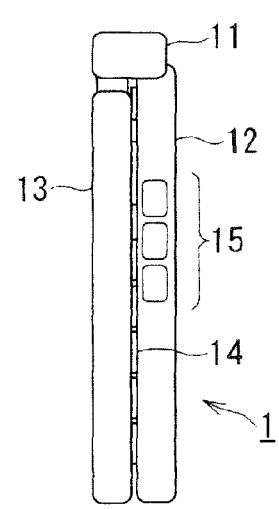
FIG. 2A          FIG. 2B

RECEIVED MAILS

41 — ✉ 0001 02/01 12:30
43 — 📄 TOSHIBA TARO — 40
FUNCTION SCHEDULE FOR NEXT WEEK

✉ 0002 02/01 11:50
SUZUKI ICHIRO
RE: I AM SENDING YOU THE MEETING MINUTES

42 — ✉ 0003 01/01 23:30
TOSHIBA TARO
RE: QUESTION ABOUT OPERATION
　　SPECIFICATIONS FOR NEXT MODEL

✉ 0004 01/01 22:10
TOSHIBA TARO
I AM SENDING YOU THE MEETING MINUTES

✉ 0005 01/01 22:05
TANAKA GORO
I AM SENDING YOU THE SPECIFICATIONS
FOR X X X

✉ 0006 01/01 20:03
SATO SABURO
I AM SENDING YOU THE PICTURE

RECEIVED MAILS

| RECEIVED MAIL ID | RECEPTION DATE AND TIME | SENDER | MESSAGE SUBJECT | MESSAGE BODY CHECK | ATTACHED FILE CHECK |
|---|---|---|---|---|---|
| 0001 | 2008/2/1 12:30 | TOSHIBA TARO | FUNCTION SCHEDULE FOR NEXT WEEK | FALSE | FALSE |
| 0002 | 2008/2/1 11:50 | SUZUKI ICHIRO | RE: I AM SENDING YOU THE MEETING MINUTES | FALSE | NONE |
| 0003 | 2008/1/1 23:30 | TOSHIBA TARO | RE: QUESTION ABOUT OPERATION SPECIFICATIONS FOR NEXT MODEL | TRUE | NONE |
| 0004 | 2008/1/1 22:10 | TOSHIBA TARO | I AM SENDING YOU THE MEETING MINUTES | TRUE | TRUE |
| 0005 | 2008/1/1 22:05 | TANAKA GORO | I AM SENDING YOU SPECIFICATIONS FOR XXX | TRUE | FALSE |
| 0006 | 2008/1/1 20:03 | SATO SABURO | I AM SENDING YOU THE PICTURE | TRUE | TRUE |
| 0007 | 2008/1/1 19:40 | ARAI KENICHI | THE FUNCTION PLAN HAS BEEN CREATED | TRUE | NONE |
| 0008 | 2008/1/1 19:15 | YAMADA MASANORI | [QUESTION] ABOUT OPERATION SPECIFICATIONS FOR NEXT MODEL | TRUE | TRUE |
| ... | ... | ... | ... | ... | ... |
| ... | ... | ... | ... | ... | ... |
| ... | ... | ... | ... | ... | ... |

FIG. 5

RECEIVED MAILS

| RECEIVED MAIL ID | RECEPTION DATE AND TIME | SENDER | MESSAGE SUBJECT | MESSAGE BODY CHECK | ATTACHED FILE CHECK | COLOR |
|---|---|---|---|---|---|---|
| 0001 | 2008/2/1 12:30 | TOSHIBA TARO | FUNCTION SCHEDULE FOR NEXT WEEK | FALSE | FALSE | RED |
| 0002 | 2008/2/1 11:50 | SUZUKI ICHIRO | RE: I AM SENDING YOU THE MEETING MINUTES | FALSE | NONE | RED |
| 0003 | 2008/1/1 23:30 | TOSHIBA TARO | RE: QUESTION ABOUT OPERATION SPECIFICATIONS FOR NEXT MODEL | TRUE | NONE | BLACK |
| 0004 | 2008/1/1 22:10 | TOSHIBA TARO | I AM SENDING YOU THE MEETING MINUTES | TRUE | TRUE | BLACK |
| 0005 | 2008/1/1 22:05 | TANAKA GORO | I AM SENDING YOU SPECIFICATIONS FOR xxx | TRUE | FALSE | GREEN |
| 0006 | 2008/1/1 20:03 | SATO SABURO | I AM SENDING YOU THE PICTURE | TRUE | TRUE | RED |
| 0007 | 2008/1/1 19:40 | ARAI KENICHI | THE FUNCTION PLAN HAS BEEN CREATED | TRUE | NONE | RED |
| 0008 | 2008/1/1 19:15 | YAMADA MASANORI | [QUESTION] ABOUT OPERATION SPECIFICATIONS FOR NEXT MODEL (PART 2) | FALSE | UN-REPRODUCIBLE | RED |
| 0009 | 2008/1/2 19:10 | YAMADA MASANORI | [QUESTION] ABOUT OPERATION SPECIFICATIONS FOR NEXT | TRUE | UN-REPRODUCIBLE | BLACK |
| ... | ... | ... | ... | ... | ... | ... |

FIG. 9

ELECTRONIC DEVICE, A METHOD OF DISPLAYING MAIL INFORMATION

BACKGROUND OF THE INVENTION

1. Field of the Invention

The present invention relates to an electronic device having a transmission/reception function for e-mail and a method of displaying e-mail, and particularly to an electronic device and method which display an unread state and an already read state of the e-mail in a suitable manner.

2. Description of the Related Art

Currently, electronic devices such as personal computer, cellular phones, etc., have come to be in common use. Also, e-mail functions, which are installed in such electronic devices, have come to be in common use, leading to a situation in which a great amount of e-mails are transmitted and received.

There is a function for e-mail whereby a document file or an image file can be transmitted in the form of an attached, file attached to the message body. Currently, the performance of electronic devices such as cellular phones etc. has improved, which allows various types of fries to be attached. Also, there are an increasing number of situations in which an e-mail is transmitted with a file attached to the message body. The content of the attached file can be checked by performing a predetermined operation when the user checks the message body, for example.

As a display example whereby e-mails (received e-mails) can be checked, summaries of the e-mails can be displayed in the form of a list.

In a case in which a great number of summaries of received mails are displayed in the form, of a list, in some cases, unread mails, which have not been checked, and already read mails, which have been already checked, are displayed on a display in a mixed manner. Conventional techniques have been disclosed in which the summaries of received mails are displayed such that the unread e-mails and the already read mails can be easily distinguished (see Japanese Unexamined Patent Application Publication No. 2005-32052, for example).

In conventional techniques, after the message body of a received mail is displayed, the user is regarded to have checked the content of the received mail, and the mail is displayed on a display such that this mail can be identified as an already read mail. Accordingly, whether or not the content of an attached file has been checked is not taken into consideration in particular. In this case, all the items of the e-mail are regarded as already having been read, even in a case in which the content of the attached file has not been checked.

Accordingly, determination cannot be made based upon the received mail list display screen whether or not a given attached file has been reproduced. In order to determine whether or not the user has checked the content of a given attached file, after the performance of an operation for displaying the details of each nail, the user must check the content of the attached file by inputting predetermined processing.

Furthermore, currently, there are many situations in which various types of files are transmitted in the form of attached files using electronic devices such as cellular phones, etc. Accordingly, there is a demand for a technique which allows the user to easily check the state of whether or not the content of each attached file has been checked.

The present invention has been made in view of such situations. It is an object of the present invention to provide an electronic device and a method which are capable of allowing the user to easily identify whether or not the user has checked the content of an attached file, in addition to whether or not the user has checked the massage body, with respect to received mails having data in the form of an attached file.

SUMMARY OF THE INVENTION

In order to solve the aforementioned problems, an electronic device according to the present invention includes: An electronic device includes a receiving unit configured to receive a plurality of e-mails having a message body and an attached file; a determination unit configured to judge whether or not the message body and the attached file of each e-mail thus received by the receiving unit have been checked; a mail management unit configured to manage mail information with respect to the plurality of e-mails, including ac least determination results obtained by the determination unit; a display unit; and a display control unit configured to display the mail information on the display unit.

In order to solve the aforementioned problems, a method of displaying mail information includes steps of: receiving a plurality of e-mails having a message body and an attached file; judging whether or not the message body and the attached file of each e-mail thus received in the receiving step; managing mail information with respect to the plurality of e-mails, including at least determination results obtained in the judging step; and displaying the mail information the plurality of e-mails managed in the managing step.

An electronic device and a method of displaying mail information according to the present invention allow the user to easily judge whether or not the content of an attached file has been checked, in addition to whether or not the message body of an e-mail has been checked.

BRIEF DESCRIPTION OF THE DRAWINGS

FIG. 1 is a diagram which shows an external configuration of a cellular phone which can be applied to an electronic device according the present invention;

FIG. 2 is a diagram which shows another external configuration of the cellular phone which can be applied to the electronic device according the present invention;

FIG. 4 is a diagram for describing an example of a conventional list display screen for the received mails displayed on a main display;

FIG. 5 is a diagram which shows an example of a received mail management table for managing the received mails;

FIG. 9 is a diagram which shows another example of the received mail management table for managing the received mails;

DESCRIPTION OF THE PREFERRED EMBODIMENTS

Figure 3:
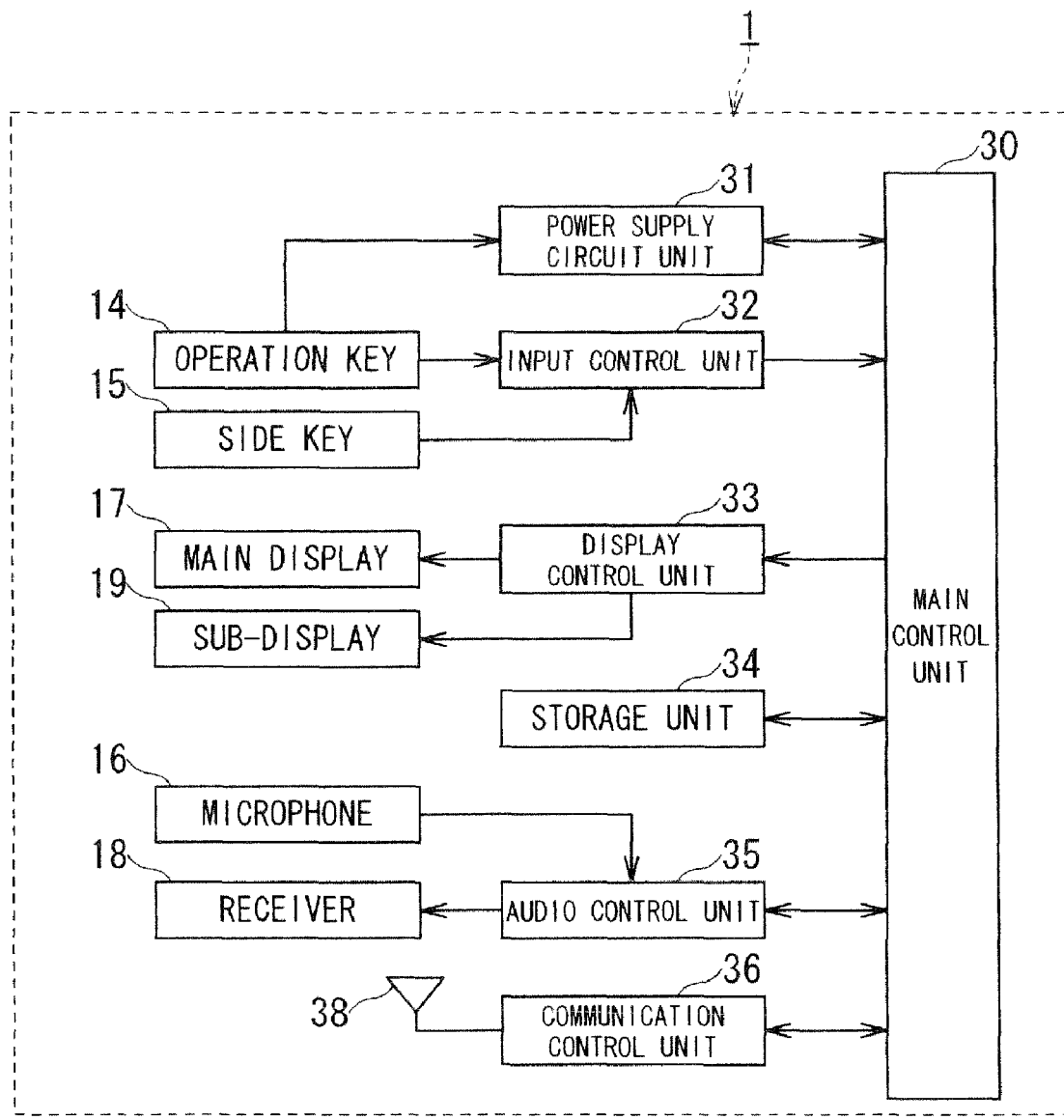
FIG. 3 is a block diagram which shows an internal configuration of the cellular phone which can be applied to the electronic device according the present invention.

Description will be made regarding an electronic device and a method of displaying mail information according to an embodiment of the present invention with reference to the accompanying drawings.

FIG. 1 shows an external configuration of a cellular flip phone 1 which is an example of an electronic device according to the present invention. It should be noted that FIG. 1A is a front view of the external configuration of the cellular phone 1 in an opened state in which the cellular phone 1 has been opened by approximately 180 degrees. FIG. 1B is a side view of the external configuration of the cellular phone 1 in the opened state.

As shown in FIGS. 1A and 1B, the cellular phone 1 includes a first casing 12 and a second casing 13 connected via a hinge connection, with a central position hinge portion arranged at the boundary between the first casing 12 and the second casing 13. The cellular phone 1 is configured such that it can be folded via the hinge portion 11 in the X direction indicated by the arrow. A transmission/reception antenna is provided at a predetermined position within the cellular phone 1, which allows radio waves to be transmitted/received to/from a base station (not shown) via the built-in antenna.

The first casing 12 includes operation keys 14 such as numeric keys, i.e., a "0" key through a "9" key, a call key, a redial key, a call end/power key, clear key, menu key, etc. Various kinds of instructions can be input using the operation keys 14.

The first casing 12 includes a cross key and a decision key as the operation Keys 14 arranged at the upper portion. Such an arrangement allows the user to move an assigned cursor in the vertical direction and the horizontal direction by operating the cross key in the vertical direction and the horizontal direction. Specifically, examples of such various operations include a scrolling operation for address book lists, e-mails, and simple home pages, and a frame stepping operation for images, etc., which are displayed on the main display 17 provided to the second casing 13.

Furthermore, such an arrangement allows various kinds of functions to be decided by pressing the decision key. For example, according to the user's operation of the cross-key, an e-mail for which the user desires to check the message body is selected from the e-mail list, displayed on a main display 17. Upon pressing one decision key toward the inner direction of the first casing 12, checking of the selected e-mail is decided, and the message body thereof is displayed.

Furthermore, the first casing 12 includes a menu key to the right, adjacent to the cross key and the decision key. Such an arrangement allows a menu selection screen to be started up by Dressing the menu key toward the inner direction of the first casing 12.

The first casing 12 includes side keys 15 for operating the cellular phone 1. The assigned processing is performed by pressing the side key 15 when the cellular phone 1 is in the opened state or in a closed state.

The first casing 12 includes a microphone 16 below the operation keys 14. The microphone 16 captures the sound of the user during a telephone call.

It should be noted that an unshown battery pack is mounted on the back side of the first casing 12. When the call-end/power key enters the ON state, electric power is supplied to each circuit unit from the battery pack, which starts up the cellular phone 1 into the operable stare.

Furthermore, the second casing 13 includes a main display 17 on the front face thereof. The main display 17 is a display configured as an LCD (Liquid Crystal Display), organic EL (Electroluminescence) display, inorganic EL display, SED (Surface-conduction Electron-emitter Display), or the like.

The main, display 17 displays the content of an e-mail, a simple home page, and the content received from an external content, server (not shown), in addition to the radio wave reception condition, the remaining battery charge, addresses and phone numbers registered in the form of a phone book, etc. The main display 17 functions a display unit.

A receiver (ear receiver) 18 is provided at a predetermined portion above the main display 17, which allows the user to perform voice communications. It should be noted that the cellular phone 1 includes a speaker (not shown) at a predetermined position, which serves as an audio output, unit, in addition to the receiver 18.

FIG. 2 shows another external configuration of the cellular flip phone 1 which is an example of the cellular phone according to the present invention. FIG. 2 shows the cellular phone 1 in the closed state, which is obtained by performing a turning operation on the cellular phone 1 in the state shown in FIG. 1 in the X direction indicated by the arrow. It should be noted that FIG. 2A is a front view of an external configuration of the cellular phone 1 in the closed state. FIG. 2B is a side view of an external configuration of the cellular phone 1 in the closed state.

The second casing 13 includes a sub-display 19 configured as a liquid crystal display, for example. The sub-display 19 displays a pictograph of an antenna which shows the current level of the antenna sensitivity, a pictograph of a battery which shows the current remaining battery charge of the cellular phone 1, an unread state icon 20 which indicates that there is any unread mail, the current time, etc. The sub-display 19 functions a second display unit which displays at least the message body of each e-mail.

FIG. 3 shows an internal configuration of the cellular phone 1 according to the present embodiment.

The cellular phone 1 has a configuration including a main control unit 30, a power supply circuit unit 31, an input control unit 32, a display control unit 33, a storage unit 34, an audio control unit 35, and a communication control unit 36, which are connected via a bus such that they communicate with one another.

The main control unit 30 includes a CPU (Central Processing Unit). The CPU integrally controls the cellular phone 1 by generating various kinds of control signals, and by supplying the control signal to each component. For example, the CPU performs input control processing on the input received via the operation keys 14, and various kinds of other computation processing, control processing, etc.

The power supply circuit 31 switches the power supply between the ON state and the OFF state according to the input received from the user via the operation keys 14. When the electric power is in the ON state, the power supply circuit unit 31 supplies electric power from the power supply source (battery or the like) to each component, which turns on the cellular phone 1 into the operable state.

The input control unit 32 includes an input interface for the operation keys 14 and the side keys 15. When the input control unit 32 detects a pressing operation on the operation key 14 or the side key 15, the input control unit 32 generates a signal that corresponds to the operation key 14 or the side key 15 thus pressed, and transmits the signal to the main control unit 30.

The display control unit 33 includes a display interface for the main display 17 and the sub-display 19. The display control unit 33 displays display information including a document, image, etc., on the display 17 or the sub-display 19 under the control of the main control unit 30.

The storage unit 34 has a configuration including ROM (Read Only Memory), a hard disk, or nonvolatile memory, which stores a processing program for processing to be performed by the main control unit 30, data which is necessary for the processing, etc., and RAM (Random Access Memory) which temporarily stores data to be used in the processing performed by the main control unit 3C, etc. The storage unit 34 stores various kinds of applications and various kinds of data groups for e-mail functions etc., executed by the CPU of the main control unit 30.

The audio control unit 35 generates an analog audio signal based upon the audio data captured by the microphone 16, and converts the analog audio signal into a digital, audio signal, under the control of the main control unit 30. Also, when the audio control unit 35 acquires a digital audio signal, the audio control unit 35 converts the digital audio signal into an analog audio signal, and outputs the analog signal to the receiver 18 as an audio signal, under the control of the main control unit 30.

Under the control of the main control unit 30, the communication control unit 36 reconstructs the data by performing spread spectrum processing on a signal received from the base station (not shown) via the antenna 38. The data is transmitted to the audio control unit 35 and is output via the receiver 18, or is transmitted to the display control unit 33 and is displayed on the main display 17, or is stored in the storage unit 34, according to an instruction from, the main control unit 30. Furthermore, under the control of the main control unit 30, when the communication control unit 36 acquires the audio data captured by the microphone 16, the data input via the input keys 14, or the data stored in the storage unit 34, the communication control unit 36 performs spread spectrum processing on the data, and transmits the data thus subjected to spread spectrum processing to the base station via the antenna 38. The communication control unit 36 functions a receiving unit configured to receive a plurality of e-mails having a message body and an attached file.

Description will be made regarding an e-mail application provided to the cellular phone 1. The e-mail application performs transmission/reception of e-mails via the communication control unit 36 shown in FIG. 3, and displays the content of the e-mail on the main display 17 or the sub-display 19 under the control, of the main control unit 30. With such an arrangement, each of the received e-mails (received mails) is stored in the storage unit 34 with a received mail ID assigned to the e-mail, and is read out as appropriate as required.

FIG. 4 is a diagram for explaining an example of a conventional received mail list display screen displayed on the main display 17.

The summaries of a predetermined number of received mails, which can be displayed on the main display 17, are displayed on the list display screen displayed on the main display 17. On the list display screen shown in FIG. 4, six received mails are displayed for each screen in order of the reception date and time. In this stage, upon pressing the cross Key, which is one of the operation keys 14, in the vertical direction, a cursor 40 for selecting a mail is moved in a stepped manner. In this case, the content of the mails in the non-display mode is sequentially displayed. Furthermore, when the decision key is pressed on the list display screen, the message body, which is a detail of the received mail selected via the cursor 40, is displayed.

The received mail list display screen displays the summaries of received mails, examples of which include the reception date and time, the sender's name, the message subject of each received mail, etc. Furthermore, an unread state icon 41, which indicates that the message body is in the unread state, or an already read state icon 42, which indicates that the message body is in the already read state, is displayed for each received mail, thereby allowing the user to easily identify whether a given mail is in the unread state in which the message body has not been checked or in the already read state in which the message body has been checked.

In a case in which the received mail has an attached file from among various types of files, such as an image file, a document file, or the like, an attached file icon 43 is displayed, which allows the user to identify that the received mail has an attached file.

In conventional techniques, in a case in which the message body of a received mail has been displayed, determination is made that the received mail is in the already read state in which the content thereof has been checked, and the already read state icon 42 is displayed for this mail on the list display screen. Accordingly, such a received mail having an attached file is regarded as already having been read, regardless of whether or not the attached file has been reproduced and the content has been checked by the user.

The cellular phone 1 according to the present embodiment allows the user to easily identify the state of whether or not the content of an attached file has been checked, in addition to the state of whether or not the message body of each mail has been checked.

FIG. 5 is a diagram which shows an example of a received mail management table for managing received mails received via the communication control unit 36. The received mail management table is stored in the storage unit 34, for example. The content of the received e-mail is written by the main control unit 30 to the received mail management table as appropriate. The main control unit 30 functions a determination unit configured to judge whether or not the message body and the attached file of each e-mail thus received by the receiving unit have been checked. The main control unit 30 and the received mail management table function a mail management unit configured to manage mail information with respect to the plurality of e-mails, including at least determination results obtained by the determination unit The received mail management table includes a "received mail ID" field, a "reception date and rime" field, a "sender" field, a "message subject" field, a "message body check" field, and a "attached file check" field, and manages the mail information with respect to each received mail.

The "received nail ID" is a serial number which is assigned to each received mail. For example, "0001" is assigned to the mail received at the latest date and time. Furthermore, the "received mail IDs" are serially assigned to the received mails in order of "C002", "0003", "0004", and so on according to one reception date and time.

The "message body check" is information which indicates whether or not the message body of the received mail has been displayed. In a case in which the message body of the received mail has been displayed on the main display 17 or the like, "TRUE" is written to the "message body check" field. In a case in which the message body of the received mail, has not been displayed, "FALSE" is written to the "message body check" field. The "attached file check" is information which indicates whether or not the received mail has any attached file. Furthermore, in a case in which the received mail has an attached file, the "attached file check" serves as information which indicates whether or not the attached file has been reproduced. In a case in which the attached file has been reproduced, "TRUE" is written to the "attached file check" field. In a case in which the attached file has not been reproduced, "FALSE" is written to the "attached file check" field. In a case in which the received mail has no attached file, "NONE" is written to the "attached file check" field.

Of the mail information items, "reception date and time", "sender", and "message subject" are written with reference to the header of the e-mail when the e-mail is received. Furthermore, when the e-mail is received, "FALSE" is written to the "message body check" field. When the message body and the attached file are checked after the mail reception, "TRUE" is written to the "message body check" field. In a case in which the e-mail has no attached file, "NONE" is written to the "attached file check" field. On the other hand, in a case in which the e-mail has an attached file, when the e-mail is received, "FALSE" is written to the "attached file check" field. When the message body and the attached file are checked after the mail reception, "TRUE" is written to the "attached file check" field.

Figure 6:
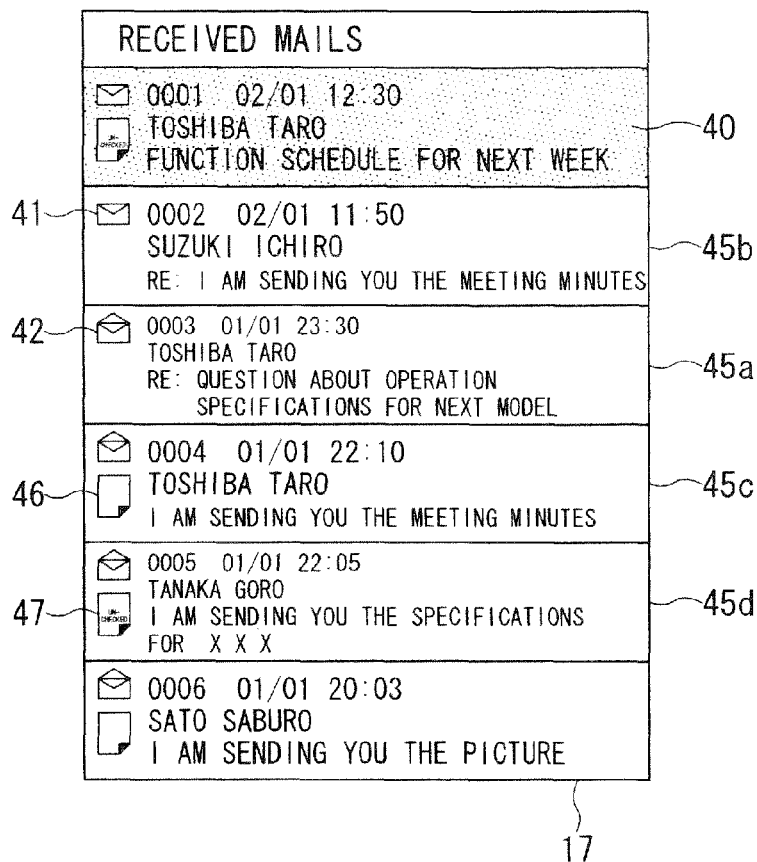
FIG. 6 is a diagram, which shows an example of a list display screen on which the summaries of the received mails are displayed.

FIG. 6 is a diagram which shows an example of the list display screen which displays the summaries of received mails. Upon reception of an instruction to display the list display screen via a predetermined operation key 14, the received mail list display screen is displayed on the main display 17.

When the main control unit 30 receives an instruction to display the list display screen, the main control unit 30 has the display control unit 33 reading out the received mail management table shown in FIG. 5, and displaying a predetermined number of received mails which can be displayed, e.g., six received nails, on the main display 17 in order of the received mail ID. The display unit 33 functions a display control unit configured to display the mail information on the display unit.

In this step, the main control unit 30 judges, based upon the mail information acquired from the received mail management table, whether or not the received mail has been checked. Then, the main control unit 30 displays an icon such that the user can identify the judgment result.

In a case in which the message body has been displayed on the main display 17, and the user is regarded to have checked the message body, the main control unit 30 displays the already read state icon 42 which indicates that the mail is in the already read state. Specifically, in a case in which the information written to the "message body check" field of the received mail management table matches "TRUE", the main control unit 30 displays the already read state icon 42. For example, the icon displayed for the received mail 45*a* with the received mail ID "0003" shown in FIG. 6 is the already read state icon 42.

On the other hand, in a case in which the message body has not been displayed, and the message body is regarded as not having been checked by the user, the main control unit 30 displays the unread state icon 41 which indicates the unread state. Specifically, in a case in which the information written to the "message body check" field of the received mail management table matches "FALSE", the main control unit 30 displays the unread state icon 41. For example, the icon displayed for the received mail 45*b* with the received mail ID "0002" shown in FIG. 6 is the unread state icon 41.

In a case in which the received mail has an attached file, and in a case in which the attached file has been reproduced, and the content thereof is regarded as having been checked by the user, the ream control unit 30 displays an already reproduced file state icon 46. Specifically, in a case in which the information written to the "attached file check" field of the received mail management table matches "TRUE", the main control unit 30 displays the already reproduced file state icon 46. For example, the icon displayed for the received mail 45*c* with the received mail ID "0004" shown in FIG. 6 is the already reproduced file state icon 46.

On the other hand, in a case in which, the attached file has not been reproduced, and the attached file is regarded as not having been checked by the user, the main control unit 30 displays an unreproduced file state icon 47. Specifically, in a case in which the information written to the "attached file check" field of the received mail management table matches "FALSE", the main control unit 30 displays the unreproduced file state icon 47. For example, the icon displayed for the received mail 45*d* with the received mail ID "0005" shown in FIG. 6 is the unreproduced file state icon 47.

Figure 7:
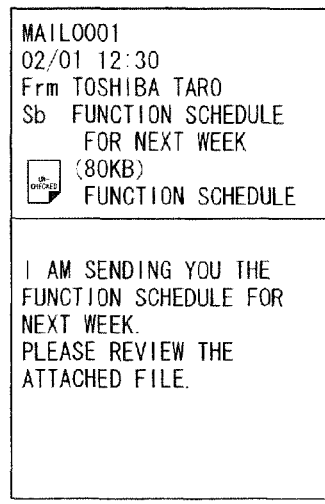
FIG. 7 is a diagram which shows an example of a mail details display screen for the received mails.

FIG. 7 is a diagram which shows an example of a received mail details display screen. The mail, details display screen further displays the size and the file name of the attached file and the message body, in addition to the content displayed on the list display screen. The content of each received mail is stored in the storage unit 34 with a received mail ID assigned to the received mail. When the main control unit 30 receives an instruction to display the mail details screen, the main control unit 30 reads out a predetermined received mail, and displays the received mail on the main display 17.

Here, the state in which the message body of a received mail is displayed means the state in which the mail details display screen shown in FIG. 7 is displayed. The state in which an attached file is reproduced means the state in which the attached file is selected via the list display screen shown in FIG. 6 or via the mail details display screen shown in FIG. 7, and the content thereof is reproduced.

Figure 8:
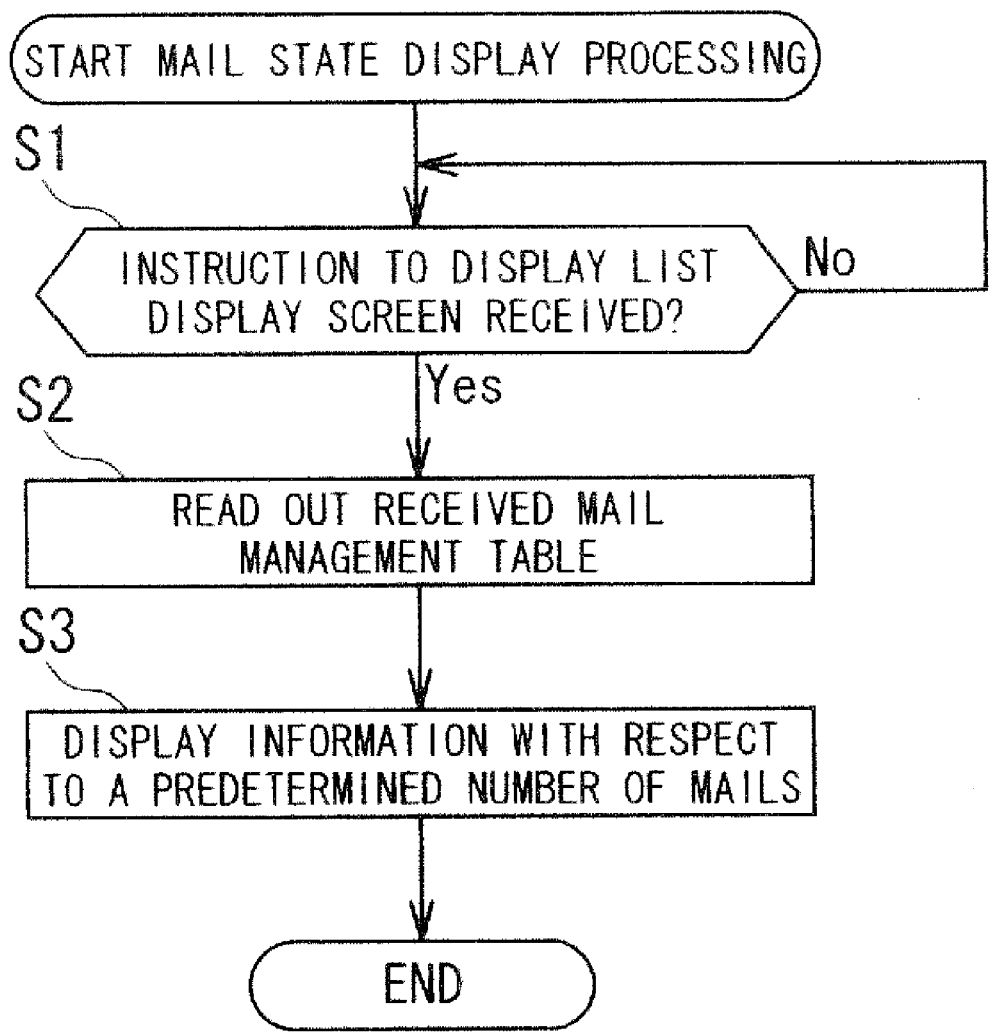
FIG. 8 is a flowchart which shows mail state display processing provided by the cellular phone according to the present embodiment.

Next, description will be made regarding mail state display processing provided by the cellular phone 1 according to the present embodiment. FIG. 8 is a flowchart which shows the mail state display processing provided by the cellular phone 1 according to the present embodiment. The mail state display processing is executed when the e-mail application provided to the cellular phone 1 is started up.

In Step S1, the main control unit 30 determines whether or not the main control unit 30 has received an instruction to start to display the received mail list display screen. For example, in a case in which the processing for displaying the received mail list, is selected via a screen displayed when the application is started up, the main control unit 30 receives this instruction.

In a case in which the main control unit 30 has determined that the main control unit 30 has not received an instruction to start to display the list display screen, the main control unit 30 holds the processing until the main control unit 30 receives a display start instruction.

On the other hand, in a case in which the main control unit 30 has determined that the main control unit 30 has received an instruction to start to display the list display screen, the flow proceeds to Step S2 in which the main control unit 30 reads out the received mail management table. The main control unit 30 reads out the mail information with respect to a predetermined number of received mails which can be displayed on the main display 17, e.g., the mail information with respect to six received mails, for example.

In Step S3, the main control unit 30 displays the summaries of the predetermined number of received mails on the main display 17 in the form of the list display screen. In an example of the list display screen shown in FIG. 6, the received mail ID and the reception date and time are displayed in the upper region, for example. In the middle region, the name of the sender of the received mail is displayed. Furthermore, in the lower region, the message subject of the received mail is displayed.

Furthermore, the main control unit 30 displays various kinds of icons at the left end of each field.

In a case in which the message body has been displayed on the main display 17, and the message body is regarded as having been checked by the user, the main control unit 30 displays the already read state icon 42 which indicates the already read state. Specifically, in a case in which the information written to the "message body check" field in the received mail management table matches "TRUE", the main control unit 30 displays the already read state icon 42. On the other hand, in a case in which the message body has not been displayed, and the message body is regarded as not having been checked by the user, the main control unit 30 displays the unread state icon 41 which indicates the unread state. Specifically, in a case in which the information written to the "message body check" field in the received mail management table matches "FALSE", the main control unit 30 displays the unread state icon 41.

Also, in a case in which the received mail has an attached file, and in a case in which the attached file has been reproduced, and the content of the attached file is regarded as having been checked by the user, the main control unit 30 displays the already reproduced file state icon 46. Specifically, in a case in which the information written to the "attached file check" field in the received mail management table matches "TRUE", the main control unit 30 displays the already reproduced file state icon 46. On the other hand, in a case in which the attached file has not been reproduced, and the content of the attached file is regarded as not having been checked by the user, the main control unit 30 displays the unreproduced file state icon 47. Specifically, in a case in which the information written to the "attached file check" field in the received mail management table matches "FALSE", the main control unit 30 displays the unreproduced file state icon 47.

It should be noted that, in a case in which the decision key has been pressed on the list display, the message body etc., which is detailed information with respect to the received mail selected via the cursor 40, is displayed on the mail details display screen shown in FIG. 7.

After the above-described steps, the mail state display processing, which is executed by the cellular phone 1, ends.

In judging whether or not a received mail has been checked, the cellular phone 1 judges whether or not the attached file has been checked, in addition to judging whether or not the message body has been checked. Such an arrangement allows the user to easily identify whether or not the attached file has been checked.

For example, the cellular phone 1 also judges whether or not each attached file has been checked. Thus, even in a case in which the cellular phone 1 handles around several hundred received mails, such an arrangement allows the user to easily identify whether or not the content of each attached file has been checked, in addition to whether or not the message body has been checked, thereby allowing the user to effectively check the received mails.

It should be noted that, with the present embodiment, the display of the icons is changed so as to allow the user to identify whether or not the content of each message body has been checked, and whether or not the content of each attached file has been checked. However, the present invention is not restricted to such an arrangement. Also, an arrangement may be made in which the display method of displaying each received mail is changed according to the state of each received mail. For example, each received mail may be displayed in a different color, in boldface, or with a different background color according to the state of each received mail. Such an arrangement also allows the user to identify the state of each received mail.

FIG. 9 is a diagram which shows another example of the received mail management table for managing the received mails received via the communication control unit 36.

The received mail management table shown in FIG. 9 further includes a "color" field, in addition to the received mail management table shown in FIG. 5. The "color" field stores information based upon which the main control unit 30 displays the mail information with respect to the received mail, the icons, and the background thereof, in a predetermined color assigned to the state of whether or not the received mail has been checked, when the main control unit 30 displays the list display screen for received mails.

Description will be made regarding a display method for received mails according to the received mail management table shown in FIG. 9.

With reference to the received mail management cable shown in FIG. 9, in a case in which a received mail is in a state in which both the message body and the attached file have been checked (e.g., received mail ID "0004"), or in a case in which a received mail having no attached file is in a state in which the message body has been checked (e.g., received mail IDs "0003" and "0007"), the mail information and the icons are displayed in a first color, e.g., black, on the received mail list display screen shown in FIG. 6.

In a case in which a received mail is in a state in which only the message body has been checked, and the attached file has not been checked (e.g., received mail ID "0005"), the mail information and the icons are displayed in a second color, e.g., green, on the received mail list display screen shown in FIG. 6.

Furthermore, in a case in which a received mail is in a state in which the message body and the attached file have not been checked (e.g., received mail ID "0001"), or in a case in which a received mail having no attached file is in a state in which the message body has not been checked (e.g., received mail ID "0002"), the mail information and the icons are displayed in a third color, e.g., red, on the received mail list display screen shown in FIG. 6.

It should be noted that, in order to allow the user to identify the state of each received mail with respect to whether or not the received mail has been checked, the color of the background may be changed, instead of changing the color of the mail information or the icons.

Also, in a case in which a file attached to a received mail cannot be reproduced by the cellular phone 1, the received mail is displayed in a list such that the user can easily identify the state of the received mail with respect to the user's checking operation. In a case in which e-mail has been received with an attached file created in a format which cannot be reproduced, the main control unit 30 writes "IRREPRODUCIBLE" to the corresponding "attached file check" field in the received mail management table, as in the case of the received mail IDs "0008" and "0009" shown in FIG. 9, for example.

Figures 10, 11:
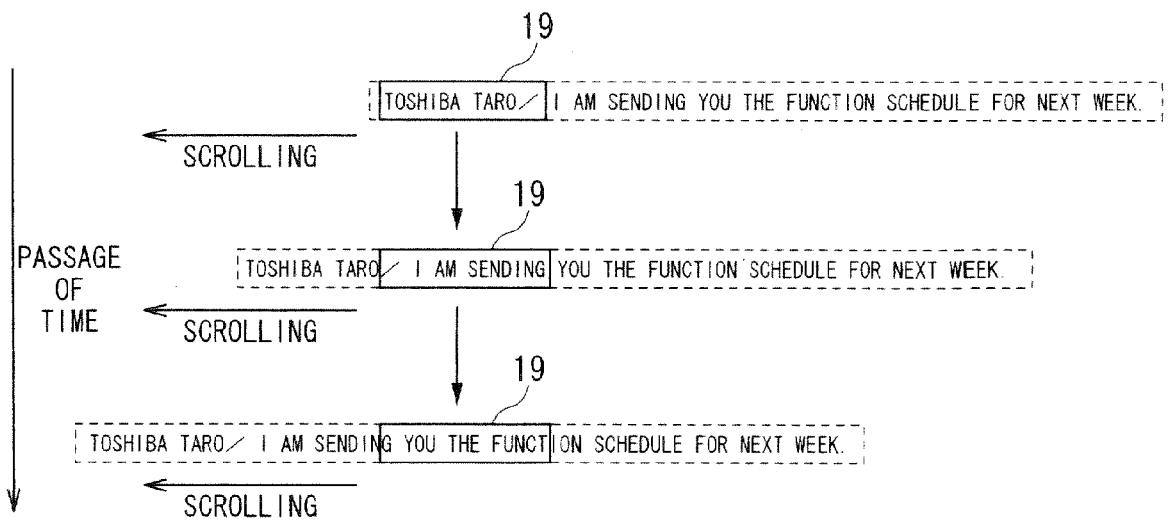
FIG. 10 is a diagram which shows a modification of the list display screen on which the summaries of the received mails are displayed.
FIG. 11 is a diagram which shows an example of the content of the received mail displayed on the sub-display.

Furthermore, in the list display screen for received mails, the color of the received mail information and the icons, or the background color, is changed according to whether or not the message body has been checked. FIG. 10 is a diagram for describing a modification of the list display screen on which the summaries of the received mails are displayed. Specifically, the summaries of the received mails with the received mail ID from "0004" to "0009" on the list display screen shows in FIG. 9.

With reference to the received mail management table shown in FIG. 9, in a case in which there is an attached file having an irreproducible file format, and in a case in which the corresponding received mail is in a state in which the message body has been checked (e.g., the received mail ID "0009"), the message information thereof and an irreproducible attached file icon 49 are displayed in a first color, e.g., black, on the received mail, list display screen shown in FIG. 10.

In a case in which there is an attached file having an irreproducible file format, and in a case in which the corresponding received mail is in a state in which the message body has not been checked (e.g., the received mail ID "0008"), the message information thereof and the irreproducible attached file icon 49 are displayed in a third color, e.g., red, on the received mail list display screen shown in FIG. 10.

As described above, in a case in which the attached file has an irreproducible file format, it is determined that there is no need to check the attached file. Accordingly, in a case in which the message body is in the already read state, determination is made that the mail should be regarded as a received mail for which the message body has been checked. That is to say, such a mail is handled in the same manner as the received mail is handled after the attached file and the message body have been checked.

For example, as in the case of the received, mail having the received mail ID "0009" shown in FIG. 10, the irreproducible attached file icon 49 is displayed at the lower left portion of the display field. Furthermore, with such, an arrangement, the "color" field of the received mail management table shown in FIG. 9 scores a first color which indicates that the content of the received mail has been checked, e.g., "black". Accordingly, on the received mail list display screen, the mail information and the icons are displayed in black.

In a case in which there is an irreproducible file, the received file information is displayed in such a manner, thereby allowing the user to easily identify whether or not there is a need to check the received mail displayed in the list.

It should be noted that, in order to allow the user to identify the state of each received mail with respect to whether or not the received mail has been checked, the color of the background may be changed, instead of changing the color of the mail information or the icons.

Description has been made regarding an arrangement in which, in a case of receiving an instruction to reproduce an attached file via the operation key 14, the attached file is regarded as having been reproduced. Also, in a case in which the attached file is an image file, a music file, or the like, and in a case in which the attached file is automatically reproduced at the same time as the message body is displayed, the attached file may be regarded as having been reproduced and the content thereof as having been checked by the user. Also, determination of whether or not the attached file has been checked, which is made in a case in which the content of an attached file has been automatically reproduced, may be changed by modifying one preference settings.

Also, an arrangement may be made in which, in a case in which a received mail has been forwarded to a different cellular phone, personal computer, or the like, a mark, which indicates that the message body and one attached file have been forwarded, is superimposed on the unread state icon 41, the already read state icon 42, the already reproduced attached file state icon 46, and the unreproduced attached file state icon 41, thereby allowing the user to identify whether or not the received mail has been forwarded.

The e-mail application has a forwarding function for automatically or manually forwarding an e-mail to other mail addresses. It is assumed that, in some cases, only the message body is forwarded without involving the attached file. In this case, a mark may be superimposed on the unread state icon 41 and the already read state icon 42 so as to indicate that only the mail message of the received mail has been forwarded, thereby allowing the user to identify that the attached file has not been forwarded.

Next, description will be made regarding rewriting processing for the received mail management table when sub-display display processing is executed in which a received mail is displayed on the sub-display 19.

When the cellular phone 1 is in the closed state shown in FIG. 2A, the sub-display 19 is the only display unit exposed to view front the outside. In this case, the sub-display 19 displays notified information such as the current time information, the unread state icon 20, etc.

The cellular phone 1 is configured such that, in a case in which there is, among the received e-mails, a received mail in the unread state in which the message body has not been read, the unread state icon 20 is displayed on the sub-display 19. In this state, upon pressing the side key 15 which is assigned to the function of displaying the content of the received mail, the sub-display 19 displays the content of the received mail such as the sender's name, the message body of the mail, etc.

It should be noted that, in a case in which a received mail has an attached file, and in a case in which the message body has been checked, determination is made for the sub-display 19 that the received mail is in the already read state, and the unread state icon 20 is not displayed on the sub-display 19, even if the attached file has not been reproduced.

FIG. 11 is a diagram which shows an example of the content of a received mail displayed on the sub-display 19. The main control unit 30 displays the message body in the form of a scrolling ticker, thereby sequentially displaying the content of the mail. The scrolling ticker display method is a display method of displaying the text information by scrolling the text information at a constant, rate according to the passage of time. For example, in a case of displaying the text information "TOSHIBA TARO/I AM SENDING YOU THE FUNCTION SCHEDULE FOR NEXT WEEK.", first, the cellular phone 1 displays "TOSHIBA TARO/", following which the scroll operation is started at a constant rate such that the text "/I AM SENDING" and "YOU THE FUNCTI" are sequentially displayed, for example, thereby sequentially displaying all the text information.

In a case in which the message body of the received mail in the unread state has entered the already read state after the message body has been displayed on the sub-display 19, the main control unit 30 performs rewriting processing which replaces "FALSE" stored in the "message body check" field in the received mail management table shown in FIG. 5 by "TRUE".

With such an arrangement, in a case in which the message body has been displayed on only the sub-display 19, and accordingly, the received mail enters the already read state, and in a case in which this received mail has an attached file, the main control unit 30 does not performs rewriting processing on the "attached file check" field in the received mail management table, thereby maintaining the "FALSE" which indicates the state in which the attached file has not been reproduced.

Figure 12:
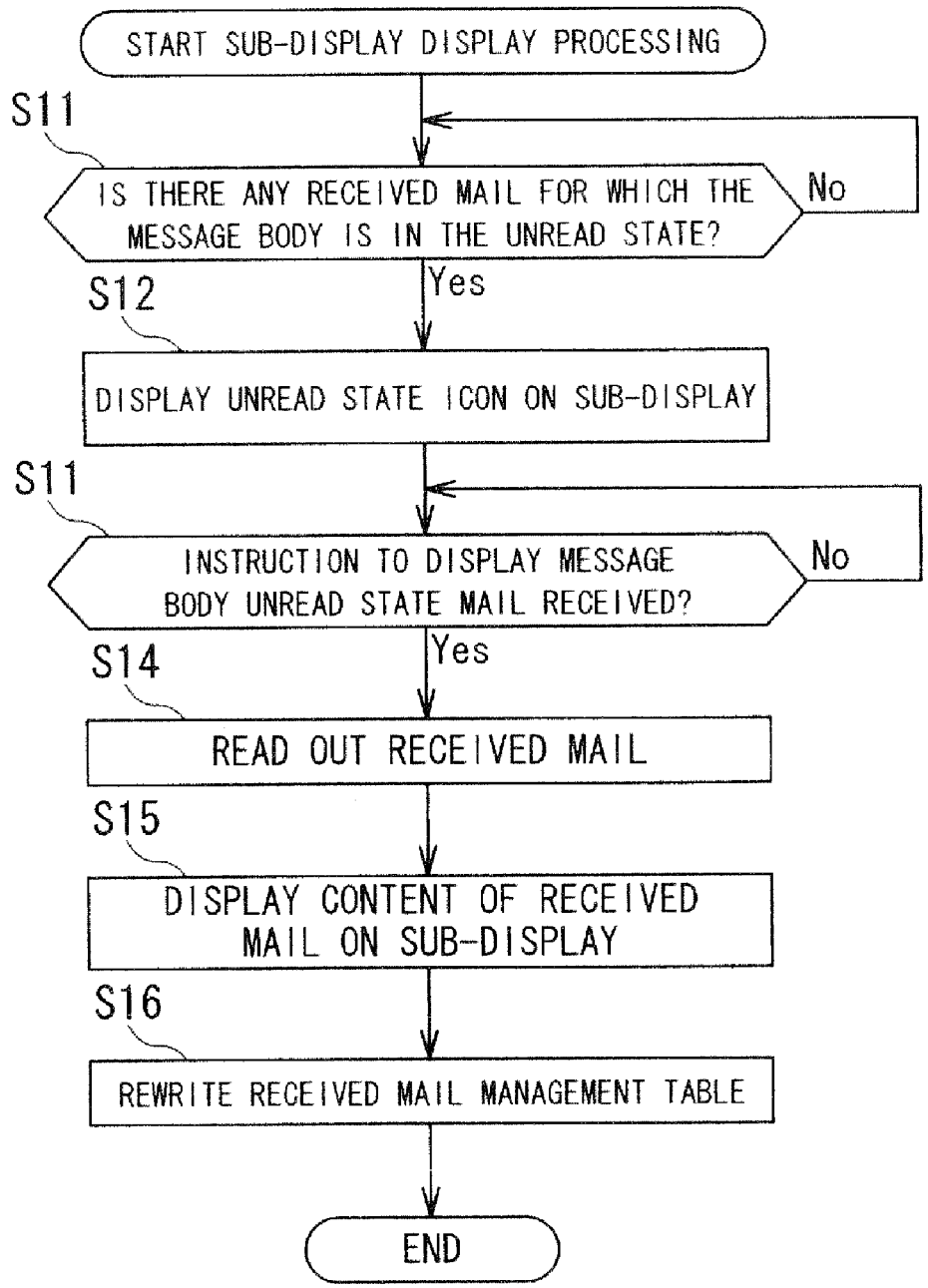
FIG. 12 is a flowchart which shows sub-display display processing executed by the cellular phone according to the present embodiment.

Next, description will be made regarding the sub-display display processing executed by the cellular phone 1 according to the present embodiment. FIG. 12 is a flowchart for describing the sub-display display processing executed by the cellular phone 1 according 10 the present embodiment.

In Step S11, the main control unit 30 determines whether or not there is a received mail in the state in which the message body has not been read (which will be referred to as "message body unread state mail" hereafter). The determination is made with reference to the received mail management table shown in FIG. 5, for example. In a case in which the main control unit 30 has determined that there is no message body unread state mail among the received mails, the main control unit 30 holds the processing until determination is made that there is a message body unread state mail.

In a case in which determination has been made in Step S11 that there is a message body unread state mail, in Step S12, the main control unit 30 notifies the user via the sub-display 19 that there is a message body unread state mail. The notifying processing is performed by displaying the unread state icon 20 on the sub-display 19 as shown in FIG. 2A, for example.

In Step S13, the main control unit 30 nudges whether or not the main control 30 has received an instruction to display a message body unread state mail on the sub-display 19. In a case of pressing the side key 15 assigned to the function of displaying a message body unread state mail, for example, the main control unit 30 receives an instruction to display a message body unread state mail. In a case in which the main control unit 30 has determined that the main control unit 30 has net received an instruction to display a message body unread state mail, the main control unit 30 holds one processing until the main control unit 30 receives an instruction to display a message body unread state mail.

In a case in which determination has been made in Step S13 that the main control unit 30 has received an instruction to display a message body unread state mail, in Step 314, the main control unit 30 reads out the content of the corresponding received mail. The content of the received mails is stored in the storage unit 34 in an appropriate manner which allows the main control unit 30 to refer to the received mail information. As the content of the received mail, the name of the sender of the received mail and the message body are read out, for example.

In Step S15, the main control unit 30 displays the content of the received mail thus read out in the readout Step S14 on the sub-display 19. The main control unit 30 displays the message body in the form of a scrolling ticker as shown in FIG. 11, for example, thereby sequentially displaying the content of the mail.

After the message body is displayed in the mail display Step S15, the main control unit 30 performs rewriting processing on the received mail management table in Step S16.

In a case in which the message body unread state mail has entered the already read state after the message body thereof has been displayed on the sub-display 19, the main control unit 30 performs rewriting processing so as to replace "FALSE" stored in the "message body check" field in the received mail management table shown in FIG. 5 by "TRUE". On the other hand, in a case in which the received mail thus displayed in the mail display Step S15 has an attached file, the main control unit 30 does not perform rewriting processing on the "attached file check" field in the received mail management table in particular, thereby maintaining "FALSE" which indicates the state in which the attached file has not been reproduced. The above is description of the sub-display display processing.

After the content of the received mail is displayed on the sub-display 19 by means of the sub-display display processing, and the received mail management table is rewritten, in a case in which the mail-state display processing as described above with reference to FIG. 8 has been executed, the information displayed on the sub-display 19 with respect to the state of whether or not the message body has been checked is updated.

Figure 13:
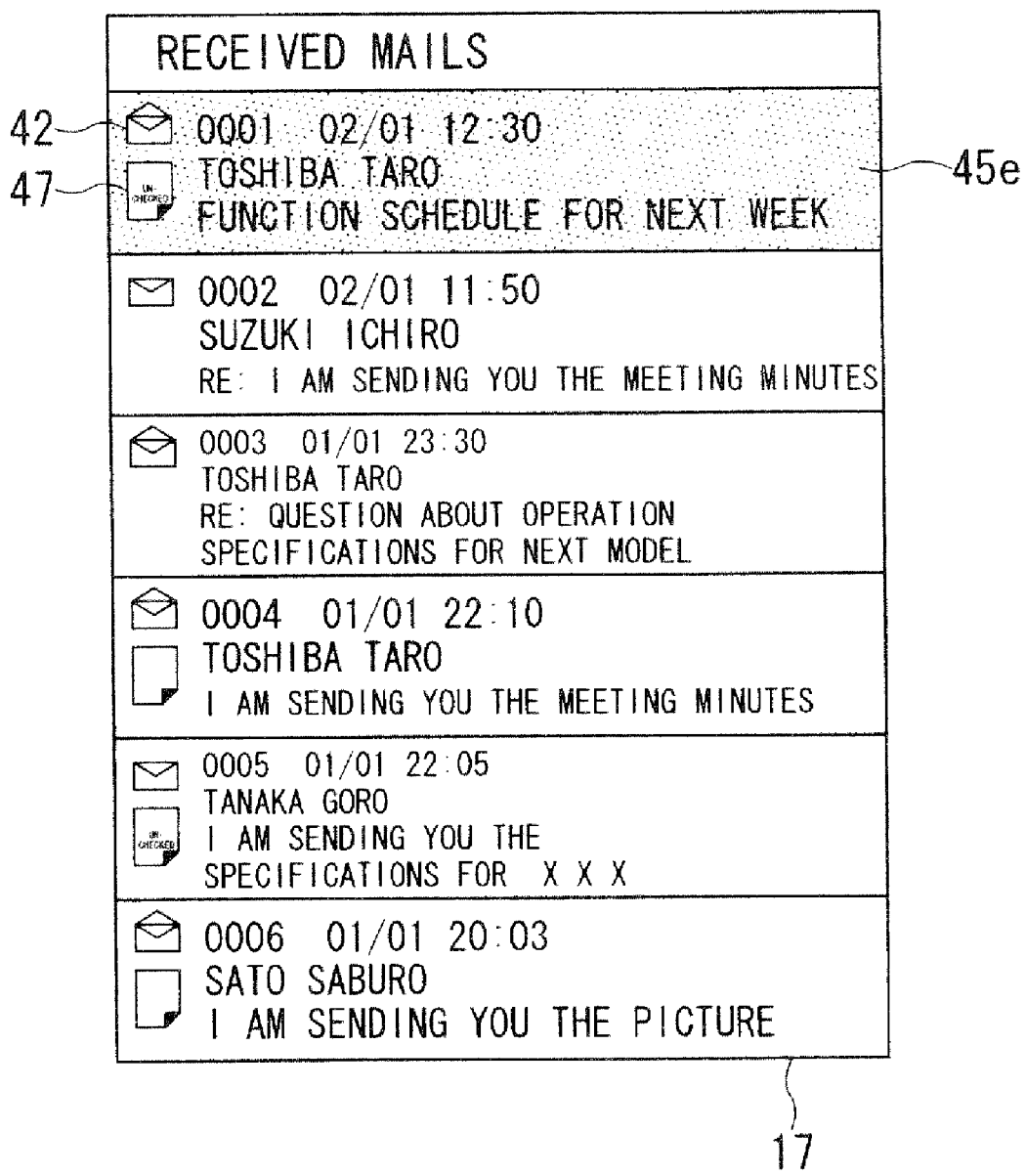
FIG. 13 is a diagram which shows an example of the list display screen in a case in which the mail state display processing has been executed after the performance of the sub-display display processing.

FIG. 13 is a diagram which shows an example of the list display screen displayed in the mail information display Step S3 by executing the mail state display processing after the performance of the sub-display display processing.

For example, the received mail 45e with the received mail ID "0001" displayed on the list display screen on the main display 17 is regarded as a received mail in the already read state in which the message body has been displayed, and the already read state icon 42 is displayed on the list display screen, even if the message body has been displayed on only the sub-display 19. In this case, the attached file has not been reproduced on the sub-display 19, and accordingly, the file unreproduced state icon 47 is displayed.

With the cellular phone 1, determination of whether or not a received mail has been checked is made giving consideration to the factor of whether or not the received mail has been checked via the sub-display 19. Thus, the cellular phone 1 more precisely displays the state of whether or not the received mail has been checked, on the list display screen displayed on the main display 17.

Furthermore, the cellular phone 1 allows the user to avoid redundant identifying operations via the sub-display 19 and the main display 17. Thus, such an arrangement allows the user to easily identify the received mail which is to be checked and the attached file which is to be reproduced, even if there are a great number of received mails.

It should be noted that the present invention may be applied, to a PDA (Personal Digital Assistant), a personal computer, a mobile game machine, a mobile music player, a moving image player, and other electronic devices having the transmission/reception function for e-mail.

Also, a series of processing described in the present embodiment may be executed by means of a software component. Also, the series of processing may be executed by a hardware component.

Description has beer, made in the embodiment of the present invention regarding an example of the processing in which the steps described in the flowchart are performed in a time-series manner according to the above-described sequence. However, these steps may not necessarily be performed in a time-series manner. Also, these steps may be executed in parallel or separately, which is also encompassed by the present invention.

What is claimed is:

1. An electronic device comprising:
a receiving unit configured to receive a plurality of e-mails having a message body and an attached file;
a determination unit configured to make a first determination as to whether or not the message body of each e-mail thus received by the receiving unit has been checked, and to make a second determination as to whether or not the attached file of each email thus received by the receiving unit has been checked, the first determination and the second determination being made separately from each other;
a mail management unit configured to manage mail information with respect to the plurality of e-mails, including at least determination results obtained by the determination results by the determination unit;

a display unit configured to display the determination results; and a display control unit configured to display the mail information on the display unit, wherein the determination results displayed by the display unit include an indication that neither the message body nor the attached file have been checked, an indication that only one of the message body and the attached file have been checked, and an indication that both the message body and the attached file have been checked, wherein the mail information is displayed in a first color for an e-mail having both an already-checked message body and an already-checked attached file, displayed in a second color for an e-mail having both a message body and an attached file, only one of which is already checked, and displayed in a third color for an e-mail having both an unchecked message body and an unchecked attached file, except that the mail information is displayed in the first color for an e-mail having both an already-checked message body and an unchecked attached file that has an irreproducible file format, and is displayed in the third color for an e-mail having both an unchecked message body and an unchecked attached file that has an irreproducible file format.

2. The electronic device according to claim 1, wherein the display control unit displays the mail information of the plurality of e-mails on the display unit in the form of a list.

3. The electronic device according to claim 1, wherein the determination unit judges that the message body has been checked in a case in which the message body of each e-mail has been displayed on the display unit, and wherein the determination unit judges that attached file has been checked in a case in which the attached file of each e-mail has been reproduced.

4. The electronic device according to claim 1, wherein the determination unit judges that the message body has been checked in a case in which the message body has been checked in case in which the message body of each e-mail has been displayed on the display unit, and wherein the determination unit judges that the attached file has been checked in a case in which a predetermined instruction has been input to reproduce the attached file of each e-mail.

5. The electronic device according to claim 1, wherein the determination unit judges that the message body has been checked in a case in which the message body of each e-mail has been displayed on the display unit, and wherein the determination unit judges that attached file has been checked in a case in which the attached file has been automatically reproduced when the message body is displayed on the display unit.

6. The electronic device according to claim 1, further including a second display unit which displays at least the message body of each e-mail, wherein the determination unit judges that the message body has been checked in a case in which the second display unit has displayed the message body of each e-mail.

7. The electronic device according to claim 1, wherein the determination unit further judges whether or not the message body and the attached file each e-mail have been forwarded.

8. A method of displaying mail information comprising steps of:

receiving, by an electronic device, a plurality of e-mails having a message body and an attached file;

judging, by the electronic device, whether or not the message body and of each e-mail thus received in the receiving step has been checked;

judging, by the electronic devices, separately from the above-noted step of judging, whether or not the attached file of each e-mail thus received in the receiving step has been checked;

managing, by the electronic device mail information with respect to the plurality of e-mails, including at least determination results obtained in the judging step; and displaying, by the electronic device, the determination results and the mail information of the plurality of e-mails managed in the managing step, wherein the determination results displayed by the displaying step include an indication that neither the message body nor the attached file have been checked, an indication that only one of the message body and the attached file have been checked, and an indication that both the message body and the attached file have been checked, wherein the mail information is displayed in a first color for an e-mail having both an already-checked message body and an already-checked attached file, displayed in a second color for an e-mail having both a message body and an attached file, only one of which is already checked, and displayed in a third color for an e-mail having both an unchecked message body and an unchecked attached file, except that the mail information is displayed in the first color for an e-mail having both an already-checked message body and an unchecked attached file that has an irreproducible file format, and is displayed in the third color for an e-mail having both an unchecked message body and an unchecked attached file that has an irreproducible file format.

9. The method of claim 8, wherein the step of displaying comprises: displaying the mail information of the plurality of e-mails in the form of a list.

10. The method of claim 8, wherein the step of judging comprises: judging that the message body has been checked in a case in which the message of each e-mail has been displayed;

and judging that the attached been checked in a case in which the attached file of each e-mail has been reproduced.

11. The method of claim 8, wherein the step of judging comprises: judging that the message body has been checked in a case in which the message body of each e-mail has been displayed, and judging that the attached file has been checked in a case in which a predetermined instruction has been input to reproduce the attached file of each e-mail.

12. The method of claim 8, wherein the step of judging comprises: the message body has been checked in a case in which the message body of each e-mail has been displayed, and judging that the attached file has been checked in a case in which the attached file has been automatically reproduced when the message body is displayed on the display unit.

13. The method of claim 8, wherein the step of displaying comprises: displaying the mail information of the plurality of e-mails on a first display unit.

14. The method of claim 13, wherein the step or displaying comprises: displaying the mail information the plurality of e-mails on a second display unit which displays at least the message of each e-mail, and judging that the message has been checked in a case in which the second display unit has displayed the message of each e-mail.

15. The method of claim 8, wherein the step of judging comprises: judging whether or not the message body and the attached file each e-mail have been forwarded.

* * * * *